(12) United States Patent
Nelson

(10) Patent No.: US 6,650,897 B2
(45) Date of Patent: Nov. 18, 2003

(54) AIRCRAFT COCKPIT TELEPHONY

(75) Inventor: Eric A. Nelson, Bellevue, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 09/990,192

(22) Filed: Nov. 21, 2001

(65) Prior Publication Data

US 2002/0082008 A1 Jun. 27, 2002

Related U.S. Application Data

(63) Continuation of application No. 08/989,122, filed on Dec. 11, 1997, now abandoned.

(51) Int. Cl.$^7$ .................................................. H04Q 7/20
(52) U.S. Cl. ........................ 455/431; 455/507; 455/508
(58) Field of Search ................................ 455/431, 507, 455/508, 524

(56) References Cited

U.S. PATENT DOCUMENTS

| | | |
|---|---|---|
| 3,999,015 A | 12/1976 | Snyder et al. |
| 4,882,745 A | 11/1989 | Silver |
| 4,903,298 A | 2/1990 | Cline |
| 5,123,112 A | 6/1992 | Choate |
| 5,438,610 A | 8/1995 | Bhagat et al. |
| 5,568,484 A | 10/1996 | Margis |
| 5,881,370 A | 3/1999 | Pottala et al. |
| 5,889,775 A | 3/1999 | Sawicz et al. |
| 5,903,227 A | 5/1999 | Scheuer |
| 5,978,689 A | 11/1999 | Tuoriniemi et al. |
| 5,991,637 A | 11/1999 | Mack, II et al. |

*Primary Examiner*—Nguyen T. Vo
*Assistant Examiner*—Temica M. Davis
(74) *Attorney, Agent, or Firm*—Perkins Coie LLP

(57) ABSTRACT

A system and method for interface of the passenger telephone communication system that is installed in many commercial aircraft with the flight crew communication console to allow the flight crew to originate and receive telephone communication over the passenger telephone communication system through their existing flight communication interface. That flight communication interface may be a headset with integral speaker and microphone, or it may be a cockpit speaker and hand microphone. A keypad or other similar hardware is also interfaced with the flight crew communication so that the flight crew may enter and transmit telephone numbers from the flight deck without disconnecting from their existing flight communication interface.

41 Claims, 3 Drawing Sheets

AIRCRAFT COCKPIT TELEPHONY

CROSS-REFERENCE TO PRIOR APPLICATION

This is a continuation of application Ser. No. 08/989,122, filed on Dec. 11, 1997 now abandoned, to which a claim for priority is made.

FIELD OF THE INVENTION

The present invention relates generally to the field of voice tele-communication, and more specifically to the field of aircraft voice tele-communication by flight crews using the public switched telephone network.

BACKGROUND OF THE INVENTION

In the field of aircraft communication, flight crews use ultra high frequency (UHF), very high frequency (VHF) and high frequency (HF) radios for communication with other aircraft and ground controllers. UHF communications are generally reserved for military or government owned aircraft. Civil commercial aircraft typically have two or three VHF radios and one or more HF radios. Recently, for over water routes where UHF, VHF and HF communications are impossible or less reliable, provision has been made for aircraft flight crews access to satellite communication (SATCOM). These UHF, VHF, HF and SATCOM radio systems provide reliable two way voice communication supporting flight safety, flight direction and flight control with specific frequencies or channels assigned for specific communication purposes and users. For example, one VHF frequency may be assigned for ground communication between an aircraft on the ground and a ground control tower at an airfield as the aircraft moves about the airfield ramp and taxiways. Another VHF frequency may be assigned for departure communication between the aircraft and the tower to provide direction and control immediately after takeoff. Once airborne, the aircraft will be assigned another VHF frequency for flight direction and control by a sector controller while operating in the airway flight structure.

For reasons of flight safety, at least one crew member is required to monitor the primary assigned aircraft control frequency which may be UHF, VHF, HF or SATCOM, and usually both crew members monitor that primary assigned aircraft control frequency in addition to selected secondary frequencies. On the flight deck, flight crews typically communicate on the UHF, VHF, HF and SATCOM radios with a headset, which contains an integral speaker and microphone. Alternatively the flight crew may use a cockpit speaker and hand microphone. The flight crew member may independently select any of the available UHF, VHF, HF or SATCOM radio transceivers for communication through a selection panel or console. In addition to transmitting and receiving on a primary frequency or channel with one radio, the flight crew member may monitor other secondary radio frequencies or channels. Transmission access to these UHF, VHF and HF radios is generally restricted to the flight crew members on the flight deck, though the received audio may be played on one of the passenger audio channels.

It is also common for selected UHF, VHF, HF or SATCOM frequencies or channels to be assigned to individual air carriers for administrative traffic that is not directly related to flight control. For example an air carrier may have an HF, VHF, or UHF frequency assigned, commonly called a company frequency, which is used to exchange administrative information (e.g. flight delays, maintenance requirements, and crew assignment information). These company frequencies are also used for plane-to-plane communication between aircraft that are owned by the same air carrier. Flight crew members frequently communicate over or monitor this company frequency, in addition to the primary control frequency.

In conjunction with this flight deck communication capability (UHF, VHF, HF and SATCOM), most commercial aircraft also have a capability in the passenger cabin for access to the public switched telephone network (PSTN). For commercial flights generally within the continental United States, the North American Telephony System (NATS) is an example. In the NATS system, a passenger uses a handset located in the passenger cabin to originate and receive telephone calls while airborne. To accomplish this, the aircraft has a transceiver system that is able to interface with ground terminals which have the ability to interface with the PSTN, thereby connecting a call from the passenger in the aircraft to any telephone number. The NATS system also provides a capability for any telephone user to call a passenger in an aircraft, if they know the appropriate access numbers. Though the NATS system has been used as an example, there are similar systems in other countries with slightly different capabilities.

While most radio communication by the flight crew is concerned with flight control and direction, there are numerous instances where the flight crew has a requirement to exchange administrative information with individuals on the ground who do not have direct access to UHF, VHF, HF or SATCOM radios. Typically, this administrative information is sent over the company radio frequency and is forwarded or relayed by phone to the desired recipient. There are a number of disadvantages to this approach. A first disadvantage is that use of UHF, VHF, HF or SATCOM radios provides no privacy, as the conversation may be overheard by any person with a suitable receiver. A second disadvantage is that only one conversation may be carried on a frequency at a time. Therefore, if a flight crew is sending administrative information on the company HF frequency, no other aircraft may use that frequency until the conversation is complete. Another disadvantage is that if the flight crew chooses to monitor the company frequency for communications that may be directed to them, they must listen to all administrative information that is exchanged, with the associated distraction. Poor transmission quality is a further disadvantages of the flight control system, especially for HF transmissions.

Though both the flight control and passenger communication systems are carried on the same aircraft, flight crew members have not had headset access to a passenger commercial telecommunication system, like the NATS system. There have been proposals to place a NATS handset on the flight deck but unless otherwise modified, use of the handset would require that the flight crew member remove their headset to use the NATS handset. Though not prohibited, this detracts from flight safety and is not an ideal solution.

U.S. Pat. No. 5,568,484 issued to Margis discloses a telecommunications system and method for use on commercial aircraft using local area networks to more easily and efficiently integrate aircraft passenger telecommunications systems with passenger entertainment systems and cabin management systems.

U.S. Pat. No. 4,903,298 issued to Cline discloses an aircraft data communication system with voice encryption that is commonly accessible by either flight crew or passengers. However Cline does not disclose use of a passenger telephone system by the flight crew.

U.S. Pat. No. 3,999,015 issued to Snyder et al. discloses an aircraft communication system providing a plurality of communication paths to interconnect flight crew and passengers. Snyder also discloses connection of external radio transceivers with the flight crew. Snyder does not disclose external communication paths for the flight crew beyond the usual UHF, VHF, HF or SATCOM radio transceivers.

None of the existing capabilities or prior art provide flight crew members with the ability to use the passenger commercial telecommunication system fully integrated with other flight communications.

SUMMARY OF THE INVENTION

It is therefore an advantage of the present invention to integrate flight crew access to the passenger commercial communication system, such as NATS, into the communication control panel of the flight deck crew. This advantage may be accomplished, e.g., by providing a selector for each flight deck communication panel that allows transmission and receipt of a telephone conversation using a passenger commercial communication system, such as NATS, through a flight deck headset or its equivalent.

It is another advantage of the present invention to integrate a telephone conversation monitoring capability into the communication control panel of the flight deck crew, where the telephone conversation uses a passenger commercial communication system, such as NATS, and the telephone conversation is intended for the particular flight crew.

It is another advantage of the present invention to provide an ability for the flight crew to originate telephone calls using their flight deck headset, or equivalent, and a means to enter and convert the dialed number into DTMF tones or other similar form as required to connect to the PSTN.

It is another advantage of the present invention to provide an ability for the flight crew to receive telephone calls through a passenger commercial communication system, such as NATS, through their flight deck headset or equivalent, in which these telephone calls are specifically intended for the flight crew, with this ability provided by individual telephone numbers assigned to each aircraft, or similar means to identify the aircraft or aircrew.

These and other advantages of the present invention will become apparent to those of ordinary skill in the art after review of the detailed description, figures and claims of the present invention.

DETAILED DESCRIPTION OF THE INVENTION

This description of the present invention contains examples drawn to specific implementations to more clearly illustrate the invention. However, the present invention is not limited to the examples provided in this description, but includes all equivalents or such other implementations as would be apparent therefore to those skilled in the art. For example, this description is based on use of the North American Telephony System (NATS) to illustrate the present invention, but any system that provides aircraft access to the Public Switched Telephone Network (PSTN) is an equivalent. Further, the description of the present invention uses a flight crew headset as an example, but any means used by flight crew for communication is an equivalent. The description also uses a numeric keypad as an example for entry of the telephone number, but any means for entry of telephone numbers is an equivalent. Finally, the description of the present invention uses UHF, VHF, HF and Satellite Communication radios as examples of flight control communications, but any flight control communication means is an equivalent.

In the preferred embodiment of the present invention, the passenger telephone communication system that is installed in many commercial aircraft (NATS being an example) is interfaced with the flight crew communication console to allow the flight crew to originate and receive telephone communication over the passenger telephone communication system through their existing flight communication interface. That flight communication interface may be a headset with integral speaker and microphone, or it may be a cockpit speaker and hand microphone. The preferred embodiment also includes a keypad or other similar hardware, suitably interfaced with the flight crew communication such that the flight crew may enter and transmit telephone numbers from the flight deck without the need to disconnect from their existing flight communication interface.

Figure 1:
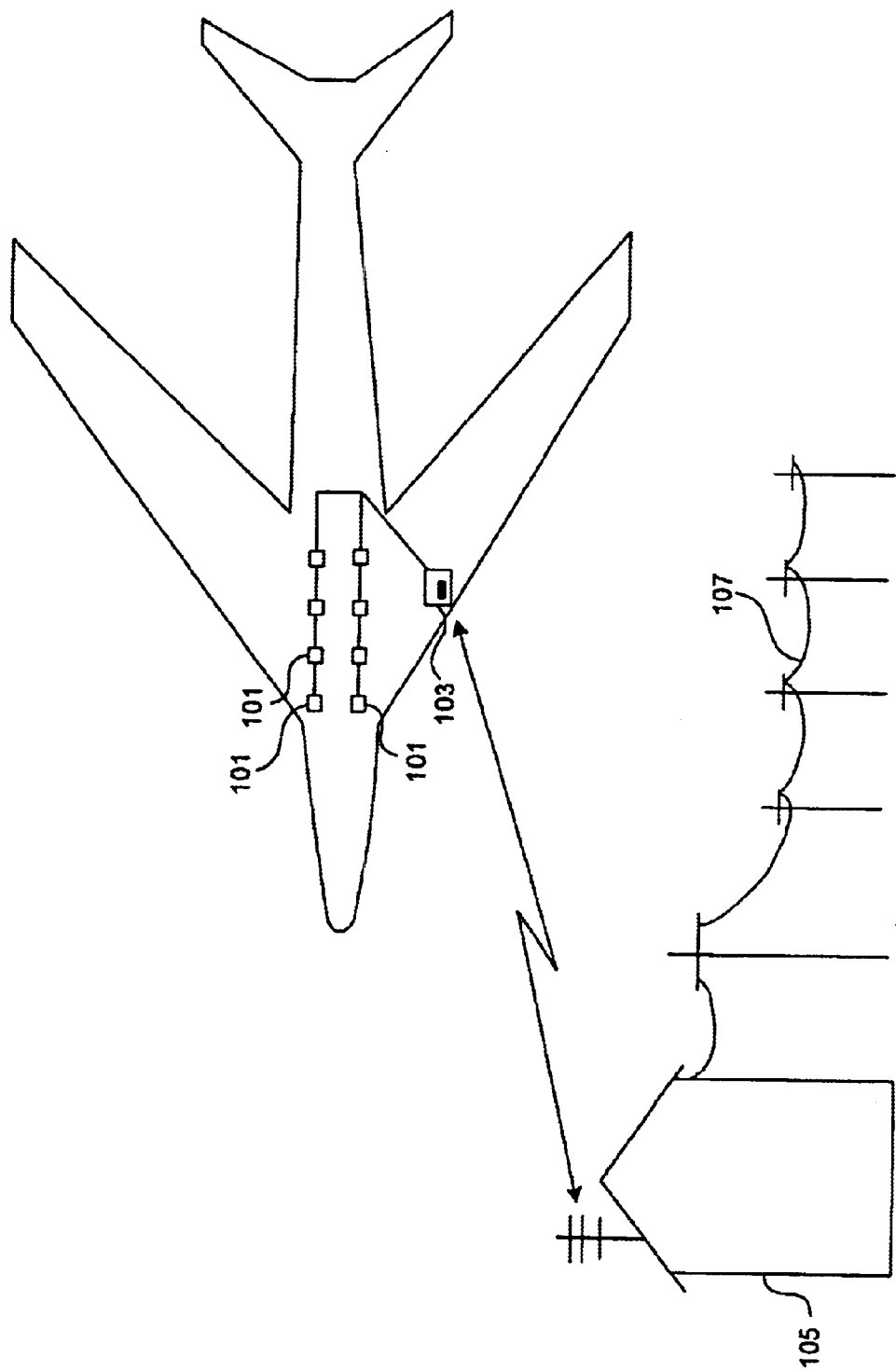
FIG. 1 illustrates an existing aircraft passenger communication system.

As an example, without limiting the present invention, the NATS system provides a reference system to illustrate how the present invention might be implemented. Referring to FIG. 1, in the NATS system, the passenger compartment of a commercial aircraft has one to a plurality of handsets 101, each with a keypad and other interface means. Each handset has a credit card reader for billing and payment purposes, and each handset may also have a data access port for connecting a computer modem or facsimile or similar data device. After activating the NATS handset with a credit card, the passenger enters a telephone number and the aircraft handset establishes an air-ground communication link through an aircraft transceiver 103 to a ground terminal 105 which connects the air-ground link to the PSTN 107 thereby completing the telephone connection. Once connected, the passenger may then communicate as though using any telephone connected to the PSTN.

Figure 2:
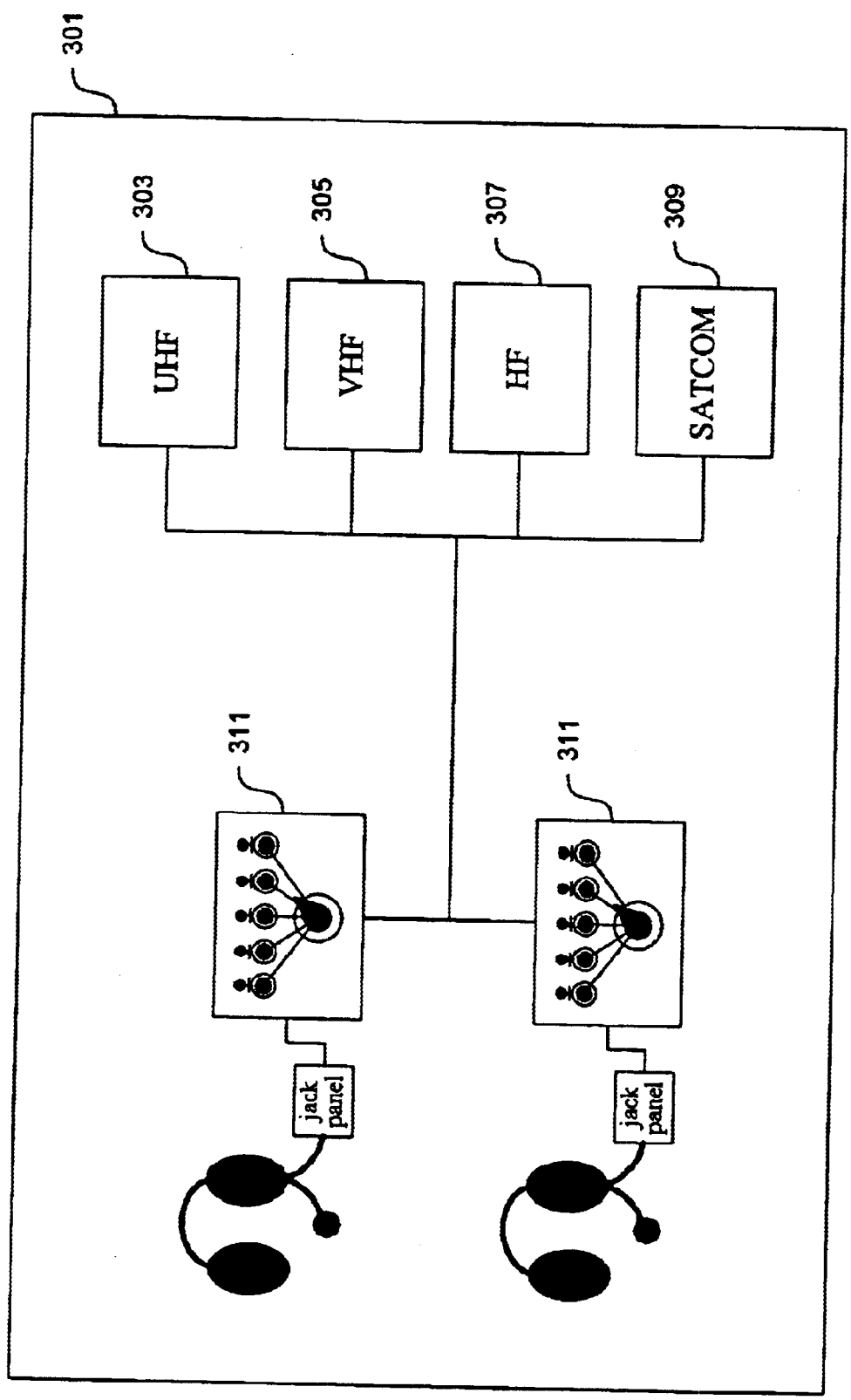
FIG. 2 illustrates an existing aircraft flight control communication system.

Referring now to FIG. 2, the flight communication control system 301 of the present invention has a mix of radio transceivers which may include UHF 303, VHF 305, HF 307 and Satellite Communication 309 that are used for air-to-air and air-to-ground communication. Each flight crew station on the flight deck has an audio control panel, or communication console 311 which allows the flight crew member to select from any of the transceivers for transmit and receive. The communication console also allows the flight crew member to selectively monitor any one or more of the other transceivers, thereby allowing the flight crew member to have one transceiver active as the primary communication channel and in addition to also monitor one or more other secondary radio channels. These secondary radio channels may include the carrier base frequency, which is used to exchange administrative information with other carrier aircraft or the carrier ground or maintenance operations. The communication console also allows the flight crew member to quickly and easily switch between different transceivers as the primary communication channel.

Figure 3:
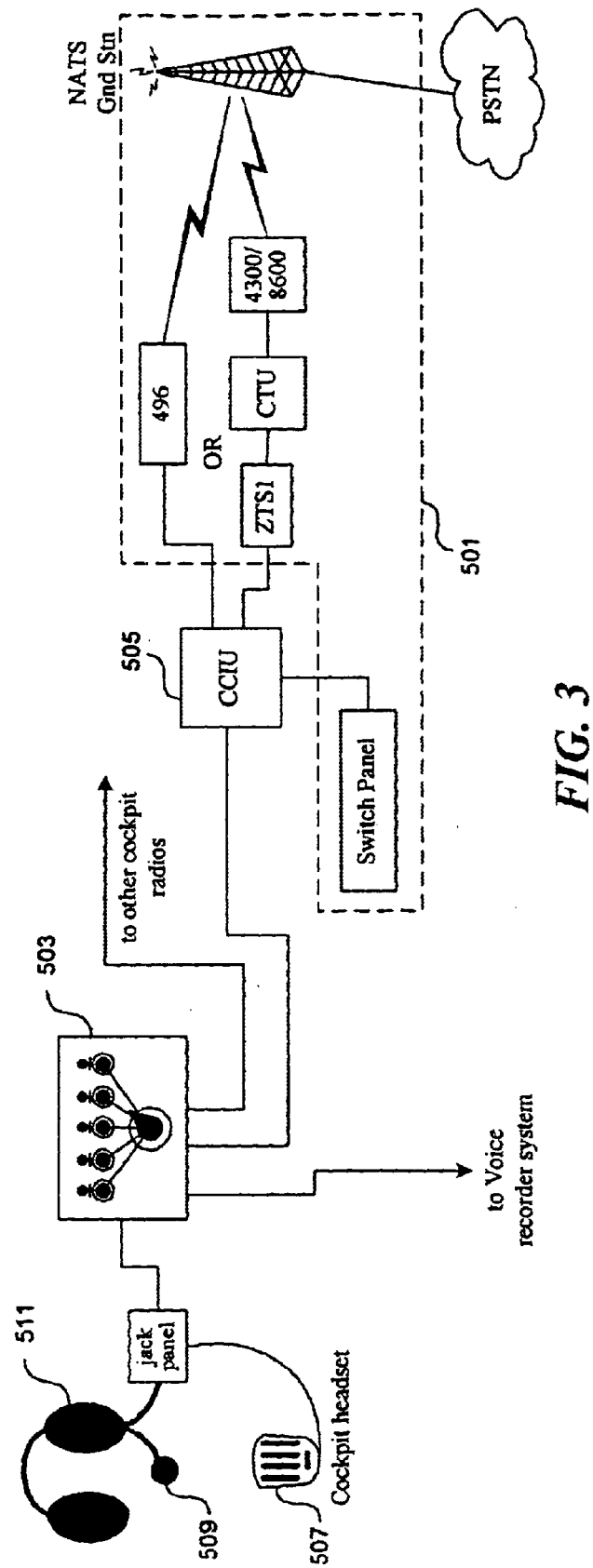
FIG. 3 illustrates the preferred embodiment of the present invention.

Without the present invention, the flight crew is limited to communication by the UHF, VHF, HF or Satellite Communication channels. Referring now to FIG. 3, the present invention provides an interface 505 between the passenger telephone system 501 (for example the NATS system) and the flight crew audio control panel or communication console 503. This interface 505 allows the flight crew member to select NATS, or another similar system on their audio control panel, as a primary communication path, so that the flight crew member microphone 509 substitutes for the handset microphone of the NATS system, and the flight crew member earpiece speaker 511 substitutes for the handset speaker of the NATS system. The present invention also provides a keypad 507, suitably interfaced with the flight crew audio control panel to enter and transmit DTMF dialing tones.

This description has shown how the flight crew may originate telephone calls by the NATS or similar system from the flight deck. The invention also provides an ability for the flight crew to receive a telephone call through the NATS or similar system. This is accomplished by providing a unique identifier for each aircraft or crew, which may be in the form of a unique telephone number. Using this unique identifier a telephone call originating from any telephone may be routed through the PSTN to the desired aircraft flight deck through the NATS or similar system. When the NATS receives a call intended for the flight deck, the flight crew is notified of the call through some suitable means. This notification of an incoming call may be audio, in the form of a ringing tone, chime or bell. In the interest of flight safety, the audio notification is provided over a speaker that is located on the flight deck rather than directly in the flight crew headset. However, there is no technical reason that the audio notification could not be placed into the flight crew audio. As an alternative, the notification may be visual, in the form of a light or annunciator panel that is on the instrument panel or otherwise visible to the flight crew.

Once the flight crew is notified of an incoming call, they may designate the NATS or similar system as the primary communication channel and then the flight crew member may establish and maintain a conversation using their headset or equivalent. Once a telephone link has been established between the flight crew member and another telephone user, other flight crew members may either monitor the conversation or actively participate in the conversation just as they could monitor or actively participate on a radio channel.

The preceding description has illustrated the present invention using examples of a flight control communication system that is common on many commercial air carriers and the North American Telephony System (NATS) as an example of a passenger telephone communication system. However, a person of ordinary skill in the art can readily see that other alternatives to the flight control communication system and the passenger telephone communication system are available and therefore the present invention is not limited by the examples provided.

What is claimed is:

1. A two-way communication system comprising:
   - at least one aircraft flight control transceiver with associated handset, wherein the aircraft flight control transceiver is adapted to allow communication on one or more flight control channels;
   - at least one aircraft passenger telephone system; and
   - a selective console connected to the flight control transceiver and the passenger telephone system to allow a flight crew member to selectively communicate two ways on the aircraft flight control transceiver and access the aircraft passenger telephone system using the headset, wherein the selective console may be configured so that the aircraft passenger telephone system is a primary communication channel and a flight control channel is a secondary communications channel, and wherein further the selective console is adapted to allow the second communications channel to be audibly monitored by the flight crew member while the primary communications channel is used for communication.

2. The system of claim 1 wherein the aircraft passenger telephone system comprises:
   - a North American Telephone System.

3. The system of claim 1 wherein the aircraft passenger telephone system further comprises:
   - a public switched telephone network; and
   - a communication interface between a communication device installed in an aircraft and the public switched telephone network.

4. The system of claim 1 further comprising:
   - a dialing device for the aircraft passenger telephone system allowing the flight crew member to place a telephone call over the aircraft passenger telephone system.

5. The system of claim 1 further comprising:
   - an individual identification device for the flight crew member, allowing the flight crew member to receive a telephone call over the aircraft passenger telephone system.

6. The system of claim 1 further comprising:
   - an individual identification device for the aircraft, allowing the flight crew member to receive a telephone call over the aircraft passenger telephone system.

7. The system of claim 1 further comprising:
   - a device for notifying the flight crew member of an incoming call over the aircraft passenger telephone system.

8. The system of claim 7 wherein the device for notifying the flight crew member further comprises:
   - an audio notification device.

9. The system of claim 7 wherein the device for notifying the flight crew member further comprises:
   - a visual notification device.

10. A two-way communication switching apparatus comprising:
    - means for connecting to at least one aircraft flight control transceiver with an associated headset;
    - means for connecting to at least one aircraft passenger telephone system; and
    - means for connecting the flight control transceiver and the passenger telephone system to at least one flight crew member, wherein the flight crew member may switch between the aircraft flight control transceiver and the at least one aircraft passenger telephone system for two-way communication external to an aircraft using the headset, wherein the aircraft passenger telephone system may be used as a primary communication channel and a channel on the aircraft flight control transceiver may be used as a secondary communications channel, and wherein further the second communications channel may be audibly monitored while the primary communications channel is used for communication.

11. The apparatus of claim 10 wherein the at least one aircraft passenger telephone system further comprises:
    - a North American Telephone System.

12. The apparatus of claim 10 wherein the aircraft passenger telephone system further comprises:

a public switched telephone network; and a communication interface between a communication device installed in an aircraft and the public switched telephone network.

13. The apparatus of claim 10 further comprising:

a dialing device for the aircraft passenger telephone system allowing the at least one flight crew member to place a telephone call over the aircraft passenger telephone system.

14. The apparatus of claim 10 further comprising:

an individual identification device for the flight crew member, allowing the flight crew member to receive a telephone call over the aircraft passenger telephone system.

15. The apparatus of claim 10 further comprising:

an individual identification device for the aircraft, allowing the flight crew member to receive a telephone call over the aircraft passenger telephone system.

16. The apparatus of claim 10 further comprising:

a device for notifying the flight crew member of a call to the flight crew member over the aircraft passenger telephone system.

17. The apparatus of claim 16 wherein the device for notifying the flight crew member further comprises:

an audio notification device.

18. The apparatus of claim 16 wherein the device for notifying the flight crew member further comprises:

a visual notification device.

19. A flight crew member two-way communication system for accessing a North American Telephone system comprising:

an aircraft flight control transceiver with associated headset;

a communication selector connected to the flight control transceiver to allow a flight crew member to selectively communicate in two-ways on the aircraft flight control transceiver and the North American Telephone System using the headset, wherein the communications selector may be configured so that the North American Telephone System is a primary communication channel and a channel on the aircraft flight control transceiver is a secondary communications channel, and wherein further the communications selector is adapted to allow the second communications channel to be audibly monitored while the primary communications channel is used for communication;

a dialing device for the North American Telephone System, allowing the flight crew member to place a telephone call over the North American Telephone System;

a unique telephone number for the flight crew member, allowing the flight crew member to receive a telephone call directed to the flight crew member over the North American Telephone System; and a visual notification device for notifying the flight crew member of an incoming call to the flight crew member over the North American Telephone System.

20. A flight crew member two-way communication system for accessing a North American Telephone System installed in an aircraft comprising:

an aircraft flight control transceiver with associated headset;

a communication selector connected to the flight control transceiver to allow a flight crew member to selectively communicate in two-ways on the aircraft flight control transceiver and the North American Telephone System, wherein the communications selector may be configured so that the North American Telephone System is a primary communication channel and a channel on the aircraft flight control transceiver is a secondary communications channel, and wherein further the communications selector is adapted to allow the second communications channel to be audibly monitored while the primary communications channel is used for communication;

a dialing device for the North American Telephone System, allowing the flight crew member to place a telephone call over the North American Telephone System using the headset;

a unique telephone number for the aircraft, allowing the flight crew member to receive a telephone call directed to the aircraft over the North American Telephone System; and a visual notification device for notifying the flight crew member of an incoming call to the aircraft over the North American Telephone System.

21. A method for two-way communication comprising:

communicating in two-ways on a flight crew aircraft flight control transceiver with an associated headset;

selecting an aircraft passenger telephone system so that the passenger telephone system is a primary communication channel and a flight control channel on the flight crew aircraft control transceiver is a secondary communications channel;

communicating in two-ways on the aircraft passenger telephone system using the headset while audibly monitoring the secondary communication channel so as to readily respond to any commands received over the flight control channel.

22. The method of claim 21 wherein communicating on the aircraft passenger telephone system includes communication on a North American Telephone System.

23. The method of claim 21 wherein communicating on the aircraft passenger telephone system includes communicating on a public switched telephone network using a communication interface between a communication device installed in an aircraft and the public switched telephone network.

24. The method of claim 21 further comprising dialing a telephone call on the aircraft passenger telephone system with a dialing device.

25. The method of claim 24 wherein the dialing device is a numeric keypad.

26. The method of claim 21 further comprising receiving a telephone call on the aircraft passenger telephone system.

27. The method of claim 21 further comprising identifying the flight crew member with an individual telephone number.

28. The method of claim 21 further comprising identifying the aircraft with an individual telephone number.

29. The method of claim 21 further comprising notifying the flight crew member of an incoming call over the aircraft passenger telephone system, with a notification device.

30. The method of claim 29 wherein notifying the flight crew member further comprises notifying the flight crew member with an audio notification device.

31. The method of claim 29 wherein notifying the flight crew member further comprises notifying the flight crew member with a visual notification device.

32. The method of claim 29 wherein notifying the flight crew member further comprises notifying the flight crew member through the headphone of the headset.

33. The method of claim 29 wherein the audio notification device is a part of the headset.

34. The method of claim 21 wherein more than one headset can participate in the same telephone conversation.

35. An aircraft communication system comprising:

a transceiver communicating with a passenger telephone system and a flight crew communication system;

a flight crew communication interface associated with the flight crew communication system; and a selective console associated with the headset to enable a flight crew member to selectively communicate using either the passenger telephone system or the flight crew communication system, wherein the selective console may be configured so that the passenger telephone system is a primary communication channel and a flight control channel on the flight crew communication system is a secondary communications channel, and wherein further the selective console is adapted to allow the second communications channel to be audibly monitored while the primary communications channel is used for communication.

36. The aircraft communication system of claim 35, wherein the flight crew communication interface is a headset.

37. The aircraft communication system of claim 35 wherein the flight crew member is enabled to selectively communicate with a ground unit using either the passenger telephone system or the flight crew communication system.

38. The system of claim 35 wherein the system is configured so that more than one flight crew communication interface can participate in the same telephone conversation.

39. The system of claim 35 wherein the system is configured to provide visual notification of an incoming call.

40. An apparatus adapted for an aircraft for enabling a flight crew member to communicate through a passenger communication system using a flight crew console, the apparatus comprising:

a selection unit on the flight crew console associated with a switch; and an interface unit for interfacing with the passenger communication system, wherein upon adjustment of the selection unit, the flight crew member can switch communication from a flight crew communication system to the passenger communication system, wherein further the interface unit may be configured so that the flight crew communication system may be audibly monitored while two-way communication is occurring on the passenger communication system.

41. An apparatus adapted for an aircraft for enabling a flight crew member to switch communication from a flight crew console between a flight crew communication system and a passenger communication system, the apparatus comprising:

a selection unit associated with the flight crew console;

a switch operably connected to the selection unit; and an interface unit operably connected to the switch, wherein upon adjustment of the selection unit, the flight crew member may switch communication from the flight crew console between the flight crew communication system and the passenger communication system, wherein further the interface unit may be configured so that the flight crew communication system may be audibly monitored while two-way communication is occurring on the passenger communication system.

* * * * *